(12) United States Patent
Pavithran et al.

(10) Patent No.: US 8,891,002 B2
(45) Date of Patent: Nov. 18, 2014

(54) FLASH SYSTEM FOR CAMERA MODULE

(75) Inventors: Prebesh Pavithran, Bukit Mertajam (MY); Yeow Thiam Ooi, Butterworth (MY); Khen Ming Goh, Mutiara Damansara (MY); Haw Chyn Cheng, Butterworth (MY)

(73) Assignee: DigitalOptics Corporation, San Jose, CA (US)

( * ) Notice: Subject to any disclaimer, the term of this patent is extended or adjusted under 35 U.S.C. 154(b) by 161 days.

(21) Appl. No.: 13/404,512

(22) Filed: Feb. 24, 2012

(65) Prior Publication Data

US 2012/0218458 A1 Aug. 30, 2012

Related U.S. Application Data

(60) Provisional application No. 61/446,113, filed on Feb. 24, 2011.

(51) Int. Cl.
*H04N 5/222* (2006.01)
*H04N 5/225* (2006.01)
*G03B 15/05* (2006.01)

(52) U.S. Cl.
CPC ...... *H04N 5/2256* (2013.01); *G03B 2215/0503* (2013.01); *G03B 15/05* (2013.01); *G03B 2215/0567* (2013.01); *H04N 5/2257* (2013.01)
USPC .......... 348/370; 348/371; 348/372; 348/373; 348/374

(58) Field of Classification Search
USPC ........................ 348/370–376; 396/176–179
See application file for complete search history.

(56) References Cited

U.S. PATENT DOCUMENTS

| | | | | |
|---|---|---|---|---|
| 4,666,276 | A | * | 5/1987 | Chan ............................. 396/180 |
| 5,565,942 | A | * | 10/1996 | Hagimoto et al. ............ 396/177 |
| 2007/0206114 | A1 | | 9/2007 | Tanaka et al. |
| 2008/0130275 | A1 | | 6/2008 | Higley et al. |
| 2009/0103194 | A1 | | 4/2009 | Chen |

(Continued)

FOREIGN PATENT DOCUMENTS

JP 2010148082 A * 7/2010
WO WO 2012 116300 A2 8/2012

OTHER PUBLICATIONS

PCT Application No. PCT/US2012/026563, International Search Report and Written Opinion dated Nov. 16, 2012.

(Continued)

*Primary Examiner* — Yogesh Aggarwal
(74) *Attorney, Agent, or Firm* — Larry E. Henneman, Jr.; Gregory P. Gibson; Henneman & Associates, PLC

(57) ABSTRACT

A camera module having a flash that is provided therein. The flash may be an LED light source. The LED may come in a package that is generally rectangular, with the exception that one corner is flattened. The camera module includes a housing that receives the light source, an image sensor, and a lens. The housing includes mating features that receive the LED package, those features including a flattened corner so that the LED package can only be received within the housing when it is properly oriented. The housing also includes electrical terminals for connection to the LED that include springs. When the LED package is properly oriented and received within the housing, contact pads on the LED package and the electrical terminals on the housing are pressed together against the resilient force of the spring.

20 Claims, 3 Drawing Sheets

(56) References Cited

U.S. PATENT DOCUMENTS

2009/0153729 A1  6/2009  Hiltunen et al.
2009/0227299 A1* 9/2009  Seeley .................... 455/575.1
2011/0255000 A1* 10/2011 Weber et al. ................ 348/374

OTHER PUBLICATIONS

PCT Application No. PCT/US2012/026563, International Preliminary Report on Patentability dated Sep. 6, 2013.

* cited by examiner

FLASH SYSTEM FOR CAMERA MODULE

CROSS REFERENCE

This application is the non-provisional of U.S. Provisional Patent Application No. 61/446,113, filed Feb. 24, 2011, entitled "FLASH SYSTEM FOR CAMERA MODULE," which is hereby incorporated by reference into this application.

BACKGROUND

Digital camera modules are currently being incorporated into a variety of electronic devices. Such camera hosting devices include, but are not omitted to, cellular telephones, personal data assistants (PDAs), and computers. The demand for digital camera modules continues to grow as the ability to incorporate the camera modules into host devices expands. Typically, host device manufacturers prefer small camera modules that minimally affect the host device design. Therefore, one design goal of digital camera modules is to reduce the number of design constraints that camera modules impart on the host device design.

Typically, conventional camera module designs present several design and manufacturing challenges to the hosting devices in which they are incorporated. For example, when a conventional camera module is incorporated into a host device, a separate flash system (e.g., light element, actuator, control circuitry, etc.) also has to be incorporated into the host device. Consequently, the host device design (e.g., physical layout, circuitry, etc.) is affected by both the camera module and the flash system. Furthermore, camera module manufacturers typically do not provide flash systems and, therefore, it is up to the host device manufacturer to do so. This is frustrating for host device manufacturers because host device manufacturers are typically not specialized in camera module technology. Of course, image quality can suffer when a camera module is not matched with the proper flash system.

Accordingly, an improved digital camera module with an incorporated flash system is needed.

SUMMARY

Disclosed herein is a camera module for connection to a portable electronic device. The camera module includes a housing having a top surface; an image sensor received within the housing; a lens received within the housing; and a light source received within the housing. The top surface of the housing is configured to allow ambient light from a selected scene outside of the camera module to pass into the housing and impinge upon the lens which focuses light onto the image sensor. The top surface of the housing is also configured to allow light from the light source to pass out of the housing toward the scene.

The light source may include an LED, which may be a white LED. The light source may include contact pads for controlling operation of the light source, and wherein the housing may include electrical terminals for electrical connection to the electrical terminals. One or both of the electrical terminals and the contact pads may include springs therein to create a spring-loaded connection therebetween.

The housing may further include a housing cover that when attached to the housing forces the light source toward the electrical terminals, thus engaging the contact pads against the electrical terminals. The electrical terminals may include springs therein to create a spring-loaded connection with the contact pads. Both the housing and the light source may include at least one registration feature thereon to facilitate proper orientation of the light source relative to the housing when the light source is received within the housing. The light source may include a package that is generally rectangular in cross-section and has one corner that is flattened to act as a registration feature, and wherein the housing may be configured to receive a generally rectangular package that has one flattened corner that acts as a corresponding registration feature.

The image sensor and lens may be aligned along a first optical axis that passes through a central region of the top surface of the housing, and the light source may have a second optical axis that is generally parallel to the first optical axis and is closer to a side of the camera module than the first optical axis. The lens may be movable within the housing to vary the relative distance between the lens and the image sensor under the control of a lens actuator that is formed in the housing. The light source may be received within a housing associated with the actuator. The movement of the lens within the housing may perform an auto-focus function.

Also disclosed herein is a camera module for connection to a portable electronic device, the camera module including a lens actuator, the actuator including a housing having a top surface; an image sensor attached to a bottom of the housing; a lens movably received within the actuator; and a light source received within the housing. The top surface of the housing is configured to allow ambient light from a selected scene outside of the camera module to pass into the housing and impinge upon the lens which focuses light onto the image sensor. The top surface of the housing is also configured to allow light from the light source to pass out of the housing toward the scene.

The housing may include a pair of external electrical terminals for control of the light source and a pair of external electrical terminals for control of the lens actuator. The light source may include an LED. The light source may include contact pads for controlling operation of the light source, and wherein the housing may include electrical terminals for electrical connection to the electrical terminals, wherein the electrical terminals may include springs therein to create a spring-loaded connection with the contact pads; and wherein the housing may further include a housing cover that when attached to the housing forces the light source toward the electrical terminals, thus engaging the contact pads against the electrical terminals.

The light source may include a package that is generally rectangular in cross-section and has one corner that is flattened to act as a registration feature, and wherein the housing may be configured to receive a generally rectangular package that has one flattened corner that acts as a corresponding registration feature, to facilitate proper orientation of the light source relative to the housing when the light source is received within the housing. The image sensor and lens may be aligned along a first optical axis that passes through a central region of the top surface of the housing, and the light source may have a second optical axis that is generally parallel to the first optical axis and is closer to a side of the camera module than the first optical axis. The lens may be movable within the actuator to vary the relative distance between the lens and the image sensor to perform an auto-focus function.

DETAILED DESCRIPTION

Figure 1:
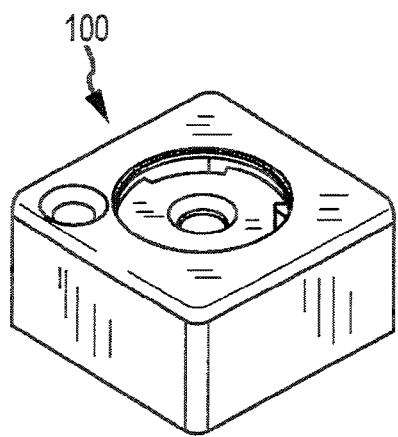
FIG. 1 is a perspective view of a camera module.

While the embodiments of the present invention are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The present invention is described with reference to the following figures, wherein like reference number denote substantially similar elements.

Figure 2:
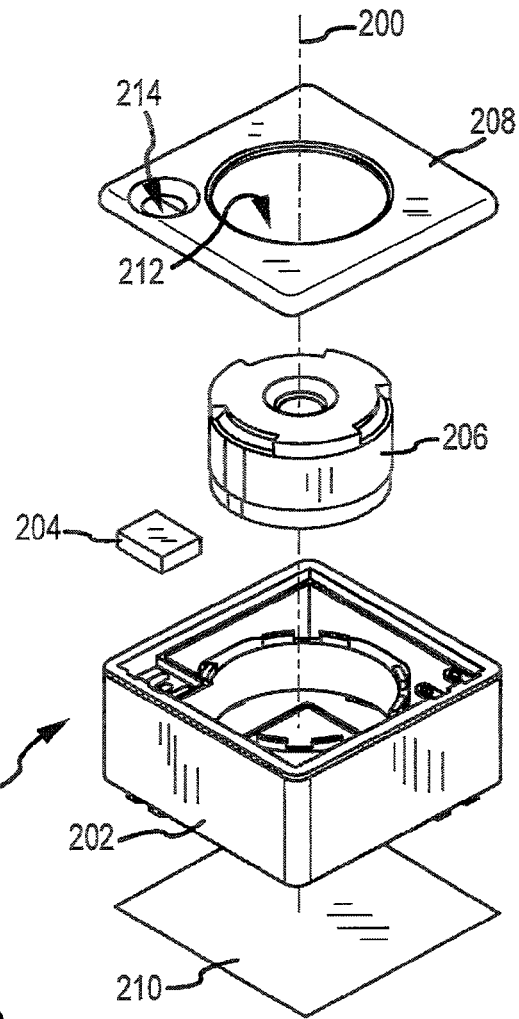
FIG. 2 is an exploded perspective view of the camera module of FIG. 1.

FIGS. 1 and 2 show a camera module 100 exploded along an optical axis 200. The camera module 100 includes an actuator system 202, an LED/TORCH 204 (e.g., a white LED), a lens system 206, and a top casing 208. The actuator system 202 is adapted to receive the LED/TORCH package 204 and the lens system 206. The top casing 208 includes a top surface with a large central opening 212 to expose the lens 206 and image sensor 210 to ambient light from a particular direction in line with the axis 200. The top surface also has a smaller opening 214 near one of the corners to allow light from the LED/TORCH 204 to be directed in a manner along an optical axis that is parallel to the axis 200. This entire assembly may be attachable to an image sensor 210 or to a circuit substrate on which an image sensor is provided. When the camera module 100 is assembled, the LED/TORCH package 204 and the lens system 206 are seated in the actuator system 202 and the top casing 208 is coupled to the actuator system 202. Accordingly, when the top casing 208 and the actuator system 202 are coupled, the LED/TORCH package 204 and the lens system 206 are enclosed there between. The LED/TORCH package 204 may be, for example, a leadless chip carrier (LCC) package that includes an LED operative to provide a flash during image capture operations of the camera module 100. The lens system 206 is operative to focus images on the image sensor 210.

In one particular embodiment of the present invention, the camera module 100 is an autofocus type of camera module and the LED/TORCH package 204 is part of the actuator system 202. As one option, the actuator system 202 could facilitate the actuation of both autofocus operations and flash operations. Alternatively, the camera module 100 could be of fixed focus type or zoom type and still include the LED/FLASH package 204.

As discussed above, the camera module 100 includes the image sensor 210 whereon images are converted into electrical data. Color calibration can be carried out in a system-on-chip (SOC) CMOS sensor, image signal processor (ISP), or a base band chip. Similarly, flash operations can be controlled by a SOC, ISP, or a baseband chip. Color calibration data can be stored into a built-in EEPROM or OTP.

FIGS. 3a-3d show a set of engineering drawings including a top view, a front view, a side view, and a cross-sectional view, respectively, of the camera module 100. Note that the cross-sectional view of the camera module 100 is taken along line A-A of FIG. 3b.

Figure 3A:
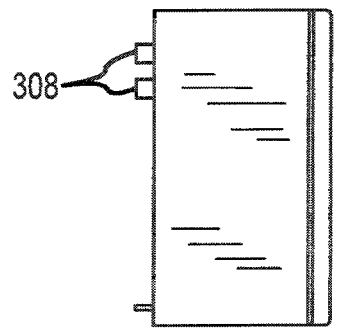
FIGS. 3a, 3b, 3c, and 3d are a top view, a front view, a side view, and a cross-sectional view, respectively, of the camera module of FIG. 1.
Figure 3B:
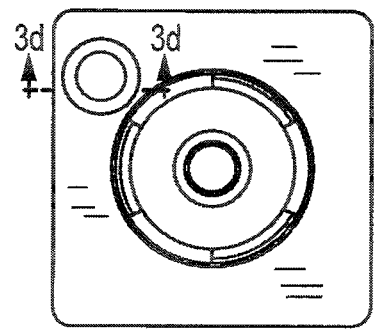
Figure 3D:
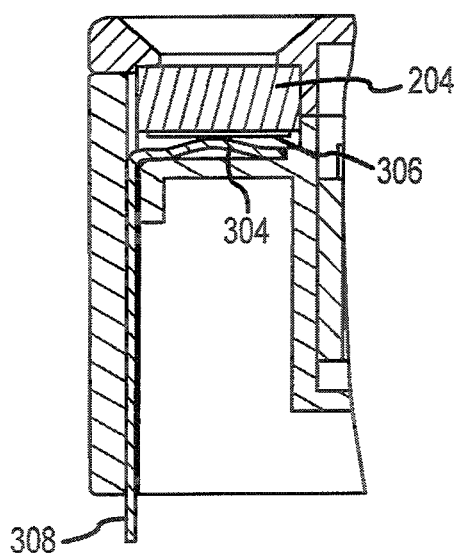
Figure 3C:
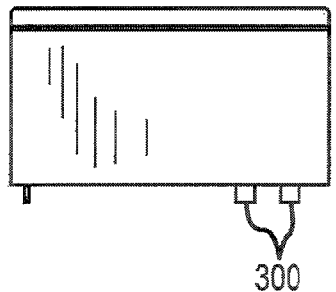

As shown in FIG. 3c, the camera module 100 further includes a set of external actuator terminals 300. As shown in FIG. 3d, the camera module 100 further includes a set of external LED/TORCH terminals 308.

As shown in FIG. 3d, the actuator system 202 includes a set of LED terminals 304 mounted thereon and the LED/TORCH package 204 includes an associated set of contact pads 306 formed thereon. The LED terminals 304 are plated spring loaded contact operative to press against the contact pads 306 when the LED/TORCH package 204 is compressed between the LED terminals 304 and the bottom of top casing 208. Of course, when the LED terminals 304 are pressed against the contact pads 306, an electrical connection is established therebetween. As shown, the LED terminals 304 extend to the bottom of the actuator with pins or external terminals 308 that are adapted to be connected to a substrate. In this particular embodiment, the contact pads 306 are gold-plated traces formed on the body of the LED/TORCH package 204.

Figure 4:
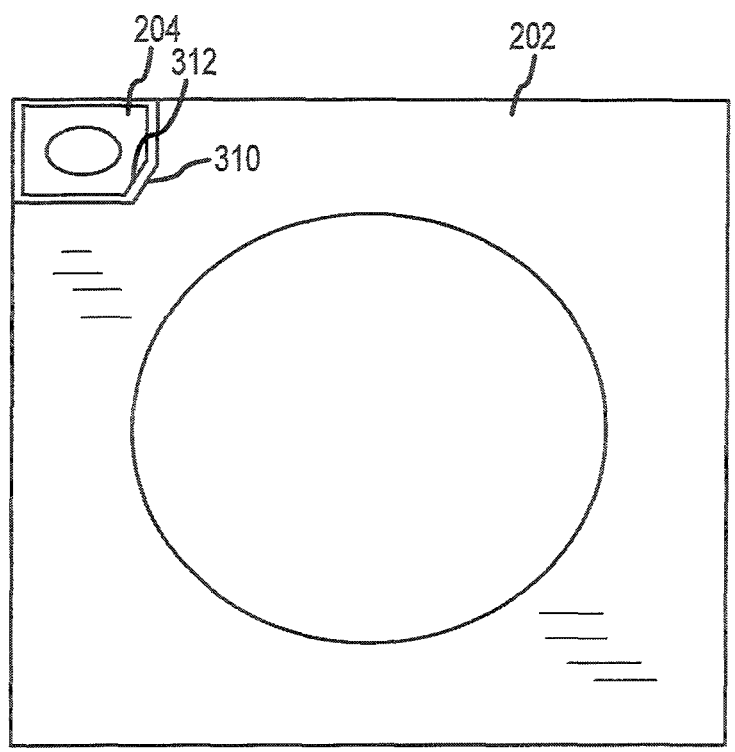
FIG. 4 is a top view of an actuator system of the camera module having an LED/TORCH package seated therein.

FIG. 4 is a top view of the actuator system 202 having the LED/TORCH package 204 seated therein. In this particular embodiment, the actuator system 202 and the LED/TORCH package 204 each include mating features such as a single flattened corner (310 and 312, respectively) so as to prevent the LED/TORCH package 204 from being improperly seated in the actuator system 202 during assembly. This feature is commonly referred to as a "POKA-YOKE" or registration feature, which are terms for a fail-safe or mistake-proof mechanism.

The disclosed system overcomes the problems associated with the prior art by providing a camera module having a flash/torch system incorporated therein. Accordingly, it need not be used in conjunction with a separate flash system, thus eliminating the need to incorporate a separate flash system in to the hosting device.

Accordingly, the camera module disclosed herein provides several advantages over conventional camera modules. As one advantage, it need not be used in conjunction with a separate flash system, thus eliminating the need to incorporate a separate flash system into the hosting device. Of course, by eliminating the need for separate flash system hosting features (e.g., circuitry, circuit connections, interfacing software/hardware, components, etc.), hosting device manufacturers are given much more design freedom. For example, the camera module occupies less space than conventional camera module/separate flash system combinations. As another example, the hosting device can interface with the camera module and flash system via the same interface because the flash system is an integral part of the camera module.

As another advantage, various parameters of the camera module can be calibrated with the flash/torch system light source (i.e. LED) as a single system to achieve optimal image quality. For example, the LED and camera operations (e.g., image capture operation, auto focus operations, etc.) can be accurately synchronized to optimize the overall range of depth of field. As another example, an individual camera module can be accurately color calibrated to a specific LED. As another example, the cone of light from the LED that coincides with the camera field-of-view (FOV) cone can be maximized. As yet another example, the flash time can be accurately synchronized with the image capture operations so as to enhance the image quality during low light capture. Accordingly, camera module manufacturers are specialized in the calibration and optimization of camera module parameters and are, therefore, more suitable to do so than host device manufacturers.

While the embodiments of the invention have been illustrated and described in detail in the drawings and foregoing description, such illustration and description is to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A camera module for connection to a portable electronic device, the camera module comprising:
   a set of electrical contacts adapted to connect said camera module within said portable electronic device;
   a housing having a top surface;
   an image sensor received within the housing;
   a lens received within the housing;
   a light source received within the housing; and
   a biasing mechanism forcing at least one contact pad of the light source and at least one electrical terminal of the housing together, the electrical terminal for controlling the light source;
   wherein the top surface of the housing is configured to allow ambient light from a selected scene outside of the camera module to pass into the housing and impinge upon the lens which focuses light onto the image sensor;
   further wherein the top surface of the housing is configured to allow light from the light source to pass out of the housing toward the scene.

2. A camera module as defined in claim 1, wherein the light source includes an LED.

3. A camera module as defined in claim 1, wherein the light source includes a white LED.

4. A camera module as defined in claim 1, wherein the light source includes a plurality of contact pads for controlling operation of the light source, and wherein the housing includes a plurality of electrical terminals for electrical connection to the contact pads.

5. A camera module as defined in claim 4, wherein the biasing mechanism includes springs in one or both of the electrical terminals and the contact pads to create a spring-loaded connection therebetween.

6. A camera module as defined in claim 5, wherein the biasing mechanism further includes a housing cover that when attached to the housing forces the light source toward the electrical terminals, thus engaging the contact pads against the electrical terminals.

7. A camera module as defined in claim 4, wherein the biasing mechanism includes springs in electrical terminals to create a spring-loaded connection with the contact pads.

8. A camera module as defined in claim 1, wherein both the housing and the light source include at least one registration feature thereon to facilitate proper orientation of the light source relative to the housing when the light source is received within the housing.

9. A camera module as defined in claim 8, wherein the light source includes a package that is generally rectangular in cross-section and has one corner that is flattened to act as a registration feature, and wherein the housing is configured to receive a generally rectangular package that has one flattened corner that acts as a corresponding registration feature.

10. A camera module as defined in claim 1, wherein the image sensor and lens are aligned along a first optical axis that passes through a central region of the top surface of the housing, and the light source has a second optical axis that is generally parallel to the first optical axis and is closer to a side of the camera module than the first optical axis.

11. A camera module as defined in claim 1, wherein the lens is movable within the housing to vary the relative distance between the lens and the image sensor under the control of a lens actuator that is formed in the housing.

12. A camera module as defined in claim 11, wherein the light source is received within a housing associated with the actuator.

13. A camera module as defined in claim 11, wherein the movement of the lens within the housing performs an auto-focus function.

14. A camera module for connection to a portable electronic device, the camera module comprising:
   a set of electrical contacts adapted to connect said camera module within said portable electronic device;
   a lens actuator, the actuator including a housing having a top surface;
   an image sensor attached to a bottom of the housing;
   a lens movably received within the actuator;
   a light source received within the housing; and
   a biasing mechanism acting on the light source;
   wherein the top surface of the housing is configured to allow ambient light from a selected scene outside of the camera module to pass into the housing and impinge upon the lens which focuses light onto the image sensor;
   further wherein the top surface of the housing is configured to allow light from the light source to pass out of the housing toward the scene.

15. A camera module as defined in claim 14, wherein the housing includes a pair of external electrical terminals for control of the light source and a pair of external electrical terminals for control of the lens actuator.

16. A camera module as defined in claim 14, wherein the light source includes an LED.

17. A camera module as defined in claim 14, wherein the light source includes contact pads for controlling operation of the light source, and wherein the biasing mechanism includes electrical terminals for electrical connection to the contact pads, wherein the electrical terminals include springs therein to create a spring-loaded connection with the contact pads; and
   wherein the biasing mechanism further includes a housing cover that when attached to the housing forces the light source toward the electrical terminals, thus engaging the contact pads against the electrical terminals.

18. A camera module as defined in claim 14, wherein the light source includes a package that is generally rectangular in cross-section and has one corner that is flattened to act as a registration feature, and wherein the housing is configured to receive a generally rectangular package that has one flattened corner that acts as a corresponding registration feature, to facilitate proper orientation of the light source relative to the housing when the light source is received within the housing.

19. A camera module as defined in claim 14, wherein the image sensor and lens are aligned along a first optical axis that passes through a central region of the top surface of the housing, and the light source has a second optical axis that is generally parallel to the first optical axis and is closer to a side of the camera module than the first optical axis.

20. A camera module as defined in claim 14, wherein the lens is movable within the actuator to vary the relative distance between the lens and the image sensor to perform an auto-focus function.

* * * * *